United States Patent Office 3,318,678
Patented May 9, 1967

3,318,678
INCREASING SACCHARIDE CONTENT IN SUGAR BEETS
Richard M. Thorup, Fresno, Calif., and Arvel H. Hunter, Portland, Oreg., assignors to Chevron Research Company, a corporation of Delaware
No Drawing. Filed Apr. 6, 1964, Ser. No. 357,734
7 Claims. (Cl. 71—2.5)

This invention concerns a method of increasing the saccharide content in plants. More particularly, this invention concerns a method of increasing the saccharide content of plants in which the saccharide content is a major source of nutrient value, e.g., sugar in sugar beets.

Plants are not particularly efficient in their use of sunlight and soil nutrients to provide food values. There is, therefore, a constant search for ways to increase the food value of plants. One area of interest is plants which produce saccharide, i.e., sugars and their derivatives. Of particular interest are sugar beets, which are a significant source of sugar in many parts of the world.

It has now been found that N-polyhalo(lower)alkyl-thio imides, when applied to healthy sugar beets, enhance the yield of sugar as compared to plants which have not been similarly treated.

Particularly, the compounds which find use are of the following formula:

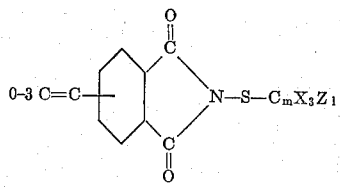

wherein $m$ is an integer of from 1 to 2 and $l=2(m-1)$, X is halogen of atomic number 17 to 35, i.e., chlorine and bromine, and Z is either hydrogen or halogen of atomic number 17 to 35, i.e., bromine or chlorine. Preferred compounds are those in which X is chlorine. As is evident from the formula, there may be from 0 to 3 sites of olefinic unsaturation. Of course, 3 sites of olefinic unsaturation indicate the benzene nucleus.

Preferred compounds which find use in this invention have the following formulas:

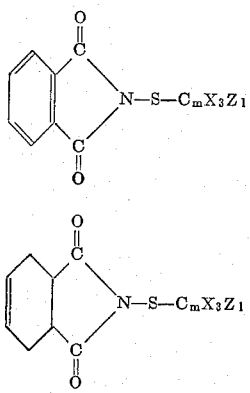

wherein $m$, $l$, X and Z have the same definition previously indicated.

Particularly preferred compounds are N-trichloromethylthiophthalimide, N-trichloromethyl-$\Delta^4$-tetrahydrophthalimide, N-1,1,2,2-tetrachloroethylphthalimide, and N-1,1,2,2-tetrachloroethylthio-$\Delta^4$-tetrahydrophthalimide.

In order to obtain an increase in the yield of saccharide from the plant, a physiologically effective amount of the compounds used in this invention is applied to the plant, particularly the sugar beet. While the compounds used in this invention are known fungicides, in this invention the compounds are applied to healthy plants under growing conditions where the plants are not subject to fungus attack, e.g., extremely damp conditions.

Various methods may be used for applying the effective compound to the plant. Since spraying is the most convenient method, this will be the one commonly used. The compounds may be sprayed from air or ground carriers. Various carriers and diluents may be used as desired, these being well known in the art. The compounds used in this invention may be present in solution, as a wettable powder, etc., with organic or inorganic diluents. The compositions may be dispersed in or upon other inert liquid and solid carriers, such as inert clay, xylenes, water, etc. The solid carriers may be in the form of a dust, or used in conjunction with suitable wetting agents to form a suitable power. The compositions may be formulated with other solvents, dispersing agents or emulsifying agents. Furthermore, these compositions may not only be applied alone, but may also be used in combination with other compounds in the formulation of the compositions.

Of particular interest as additives used in conjunction with this invention are potassium and various agronomically effective trace metals. These include such metals as magnesium, manganese, iron, zinc and copper as their cations. Of particular interest are potassium cations. The anions used in conjunction with these cations are well known in the art and any nontoxic or inert anion may be used.

The compositions are applied to the plant during the growth cycle. Usually the compositions will be applied anywhere from 3 months after planting to 2 weeks prior to harvest, particularly from about 4 months after planting to 2 weeks prior to harvest. The compositions may be applied only once or repeatedly. Generally, the number of applications of the effective compositions will be anywhere from 1 to 5. Preferably, the compound will be applied twice, once early and once late in the season.

The amount of the effective compound applied will vary widely depending on the method of application, the number of plants in the area, the number of repetitions and frequency of application of the effective compounds. Usually, about 1 to 10 pounds per acre will be used with each application. Generally, not more than a total of 15 pounds per acre will be used.

The amount of the trace elements used in conjunction with the polyhaloalkyl N-thio compounds will generally be between 0.1 and 5 parts per part of the N-thio compound. More generally it will be about 0.2 to 2 parts per part of the N-thio compound. The amount of potassium cation will range from about 1 to 20 parts per part of the N-thio compound.

The following examples are offered by way of illustration and not by way of limitation.

EXAMPLE 1

Plots of sugar beets were sprayed with N-trichloromethylthio-$\Delta^4$-tetrahydrophthalimide at differing concentrations, as well as in combination with trace metals, by means of both ground equipment and air sprays. The following table indicates the results as to sugar content 14 and 24 days after application of the N-trichloromethyl-thio-Δ⁴-tetrahydrophthalimide.

TABLE I

| N-trichloromethylthio-Δ⁴-tetrahydrophthalimide, lbs./acre | Presence of Trace Metals [1] Yes or No | Percent Sugar, Days after Appln. | | Average, percent Sugar | Purity, percent |
|---|---|---|---|---|---|
| | | 14 | 24 | | |
| 2 | No | 15.75 | 15.90 | 15.83 | 84.2 |
| 4 | No | 17.90 | 15.40 | 16.65 | 83.5 |
| 2 | Yes | 17.10 | 16.15 | 16.63 | 84.8 |
| 4 | Yes | 16.10 | 16.0 | 16.05 | 83.3 |
| | No | 15.00 | 15.30 | 15.15 | 83.1 |

[1] A weight ratio of 1 to 4 of the following solution to the above N-thio compound was used.

```
                                                    Percent by weight
Nitrogen (urea) _____ 9.2
P₂O₅ (hexametaphosphate) _____ 4.3
MgO _____ 22.5
MnSO₄ _____ 5.0
Fe₂(SO₄)₃ _____ 5.0
ZnSO₄ _____ 20.0
Basic zinc sulfate _____ 8.5
Basic cupric zinc sulfate _____ 3.5
```

EXAMPLE 2

N-trichloromethylthio-Δ⁴-tetrahydrophthalimide was applied to beet fields at a rate of 5 pounds per acre. Plots were sampled by digging beets from 10 feet of row. Numerous replications were set up so that checks and comparisons could be carried out and duplicate samples were taken at randomly selected locations within each replication. In one group, the N-trichloromethylthio-Δ⁴-tetrahydrophthalimide was applied 5 weeks prior to harvest and in another series, the compound was applied 3 weeks prior to harvest. The following table indicates the results.

TABLE II

| | Average weight of beet, lbs./beet | Sugar, percent | Sugar, lbs./beet |
|---|---|---|---|
| Treated 5 weeks prior to harvest | | | |
| Treated | 13.90 | 14.9 | 2.071 |
| Untreated | 11.63 | 14.6 | 1.708 |
| Treated 3 weeks prior to harvest | | | |
| Treated | 9.44 | 14.5 | 1.366 |
| Untreated | 9.74 | 13.4 | 1.303 |

It is evident from the above tables that sugar is increased not only percentagewise but also in total content. Thus, significant enhancement of saccharide content is obtained per beet.

As will be evident to those skilled in the art, various modifications on this process can be made or followed, in the light of the foregoing disclosure and discussion, without departing from the spirit or scope of the disclosure or from the scope of the following claims.

We claim:

1. A method of increasing the saccharide content in sugar beets which comprises applying to the beets during the growing season a physiologically effective amount of a compound of the formula:

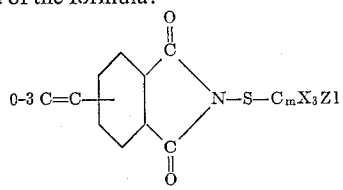

wherein $m$ is an integer of from 1 to 2, $l=2(m-1)$, X is halogen of atomic number 17 to 35, and Z is selected from the group consisting of hydrogen and halogen of atomic number 17 to 35.

2. A method according to claim 1, wherein the physiologically effective dosage of the compound is applied at least 3 months after the seed is planted.

3. A method according to claim 2, wherein the compound is N-trichloromethylthio-Δ⁴-tetrahydropthalimide.

4. A method according to claim 2, wherein the compound is N-1,1,2,2-tetrachloroethyl-Δ⁴-tetrahydrophthalimide.

5. A method of increasing the saccharide content of sugar beets which comprises applying to the healthy sugar beet plant at least 3 months after the seed has been planted, but 2 weeks prior to harvesting, at least 1 pound per acre of N-trichloromethylthio-Δ⁴-tetrahydrophthalimide.

6. A method of increasing the saccharide content in sugar beets which comprises applying to the beets during the growing season in conjunction with potassium anion a physiologically effective amount of a compound of the formula:

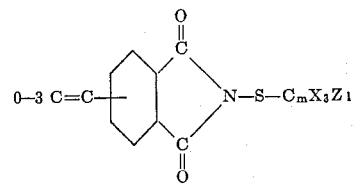

wherein $m$ is an integer of from 1 to 2, $l=2(m-1)$, X is halogen of atomic number 17 to 35, and Z is selected from the group consisting of hydrogen and halogen of atomic number 17 to 35.

7. A method according to claim 6 wherein at least one cation selected from the group consisting of magnesium, manganese, iron, zinc and copper is also added.

References Cited by the Examiner

UNITED STATES PATENTS 2,553,770  5/1951  Kittleson et al. _____ 167—33
2,746,854  5/1956  Yowell et al. _____ 71—2.5

LEWIS GOTTS, *Primary Examiner.*

JAMES O. THOMAS, JR., *Examiner.*